United States Patent Office 3,289,319
Patented Dec. 6, 1966

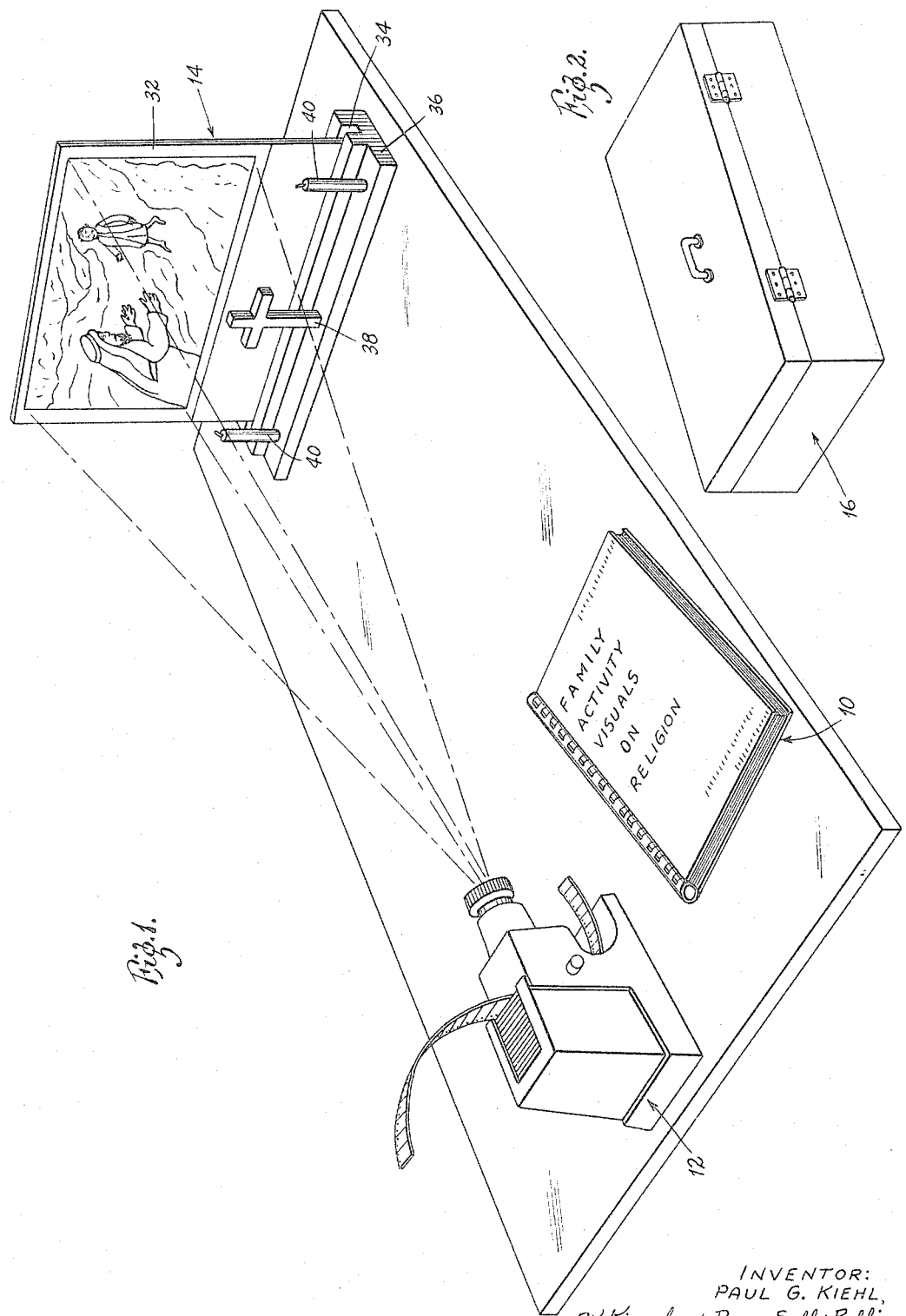

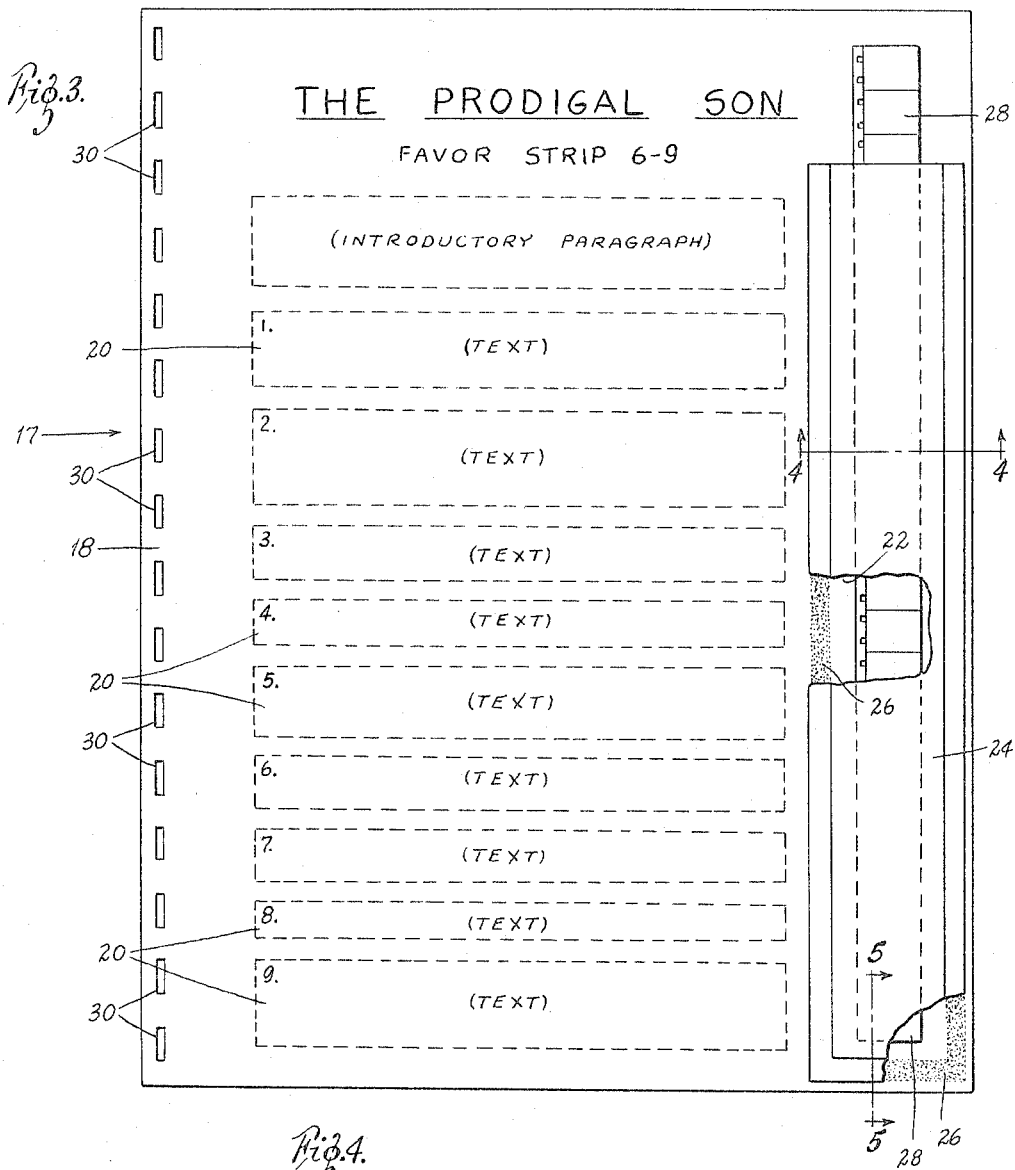

3,289,319
INSTRUCTION PACKAGE AND ELEMENTS
THEREOF
Paul G. Kiehl, 11035 Perham Drive, St. Louis, Mo.
Filed Aug. 8, 1963, Ser. No. 300,807
3 Claims. (Cl. 35—8)

The present invention relates generally to the art of instruction through the use of audio-visual materials, and more particularly to a novel instruction package and novel elements thereof for audio-visual instruction.

The use of audio-visual materials in teaching and training programs is nothing new. The last two decades have seen the development of many A-V materials, equipment and techniques which have greatly increased the effectiveness of teaching and training in nearly every area of learning.

Since audio-visual materials stimulate the senses of hearing and sight, they have a special advantage. Research and case history studies have demonstrated that audio-visual materials, when properly produced, properly programmed for learning and properly used in teaching and training, offer a tremendous advantage to both teacher and student.

To date, most of the audio-visual materials have been produced and programmed for use by larger groups in a classroom environment. Little consideration has been given to the needs of small groups and to the needs of the individual in and outside of the classroom. Nor has much been done to package learning programs which are oriented toward self or auto-instruction.

Today's requirements for teaching and training in the military, in business and industry in general, and in religious education, point up the great need for audio-visual materials and supporting equipment which have been educationally engineered for auto-instruction on the part of individuals and of small groups.

There is need for packaged learning programs, standard in nature and content, created at a professional level, based on centrally prepared lesson plans, oriented toward self-instruction, easy to use, to do a more effective job in less time at a lower unit cost for more people even though they may be widely scattered as individuals or as small groups.

Therefore, an object of the present invention is to provide a novel instruction package and novel elements thereof to meet and satisfy the long-existing needs as set forth above.

In brief, the present novel instruction package includes a projector for narrow film strips, a novel miniature screen and an instruction sheet or folder, or sheets and folders, said sheets or folders when in multiples being in a loose-leaf binder, bound in book form, or the like, each sheet or folder comprising a complete lesson for an instruction period including written material, a pocket, and a film strip disposed in the pocket keyed into the written material of the sheet or folder. A disc record may be included with each sheet or folder in a pocket to augment or to repeat the written material in audio form when desired. Testing sheets may also be provided.

Therefore, another object is to provide a novel instruction package and novel elements thereof for audio-visual teaching having wide adaptation and use, as in the military, in business, in industry, in general education, in religious education, and in any other field where individual or small group instruction is needed.

Another object is to provide a novel instruction package and novel elements thereof constructed to provide audio-visual instruction in simple, easy-to-use, easy-to-store form.

Another object is to provide a novel instruction package and novel elements thereof for audio-visual instruction which is of low cost, yet is capable of presenting a complete teaching and training program, as required.

Another object is to provide a novel instruction package and novel elements thereof which incorporates a complete teaching and training program format, which may be set up and applied with minimum loss of time, and which otherwise fulfills the objects and advantages sought therefor.

Another object is to provide a novel, compact instruction unit for audio-visual instruction in which the subject material is physically associated for instant convenient use.

Another object is to provide a novel, compact instruction unit for audio-visual instruction in which the subject material is incorporated on a single sheet or folder in flat relationship, thereby requiring minimum storage space.

Another object is to provide a novel, compact instruction unit for audio-visual instruction in which the subject material is associated as sheets or folders in book form.

Another object is to provide a novel, compact instruction book for audio-visual instruction which includes a plurality of complete sheet-type or folder-type units, each incorporating eye and voice subject material.

The foregoing and other objects and advantages are apparent from the following description taken with the accompanying drawings, in which:

FIGURE 1 is a perspective view of elements of the present novel instruction package incorporating the inventive principles thereof;

FIGURE 2 is an isometric view on a smaller scale of a container for transporting and storing the elements of the instant novel instruction package;

FIGURE 3 is an enlarged plan view of a unit of the present novel lesson material, folder or book;

FIGURE 4 is a further enlarged, transverse, cross-sectional view taken on substantially the line 4—4 of FIGURE 3; and FIGURE 5 is a longitudinal cross-sectional view taken on substantially the line 5—5 of FIGURE 3 on the same scale as FIGURE 4.

Refering to the drawings more particularly by reference numerals, in FIGURE 1 there are shown the elements of the present novel instruction package including a lesson or instruction book 10, a projector 12 for film strips, and an alter screen 14. In FIGURE 2, there is illustrated a carrying case 16 for elements shown in FIGURE 1. Compact storage of the elements of FIGURE 1 within the casing 16 reduces to a minimum problems of handling the present novel instruction package, including transporting, storage, and ready accessibility for use.

In FIGURES 3–5, there is illustrated a unit 17 from the book 10. The unit 17 includes a sheet 18, paragraphs of instruction or lesson text 20, illustrated as numbered paragraphs 1 through 9, a pocket 22 formed by a sheet of material 24 mounted on the sheet 18 by suitable adhesive 26, and a narrow film strip 28 in the pocket 22. More than one strip 28 may be included. The pictures on the film strip 28 are synchronized with the text paragraphs, thus, each unit 17 is a complete unit for audio-visual presentation of a lesson or instruction, indicated in FIGURE 3 as the Prodigal Son. Obviously, the particular subject matter will depend upon the particular use to which the unit 18 is devoted.

The illustrated sheet 18 has marginal openings 30 for mounting in the folder or book 10. However, the sheets 18 may be assembled and mounted by any desired means, permanent or removable, as desired. It is contemplated that the book 10 would include a plurality of units 17 directed to one or a plurality of subjects. For example, when the present novel instruction package is employed in religious instruction, fifty-two units 17 may be bound as a book 10 for a full year's presentation.

It is contemplated that the sheet of material 24 forming the pocket 22 may be transparent or opaque, as desired, for a particular use. Furthermore, the sheet 18 may be used on both sides, for example, there may be nine paragraphs on each side and eighteen pictures on the film strip 28. Additionally, the sheet 18 may comprise a folder of two sheets, which will afford additional space for text or cover additional pictures on this film strip. A pocket may be provided for either the sheet 18 or a folder to hold a disc record of the same or additional text that can be employed when a player machine is available and it becomes more desirable to use a record than to read the material.

When the present novel instruction package is employed in religious education, the altar screen 14 including a removable sheet 32 of wood, plastic, paper, etc., frictionally held in a slot 34 in a base 36, a small cross 38, and candles 40, is used. When the instruction is secular, the cross 38 and candles 40 are omitted.

It is clear from the foregoing that the present novel instruction package incorporates many advantages over existing instruction devices. It eliminates the cost and confusion of separate plastic cans for the film strips, special labels for these cans, separate lesson manual or guides, and bulky storage boxes. The book 10 keeps the text and film strips together as a unit in easy-to-use easy-to-store form.

It is apparent that there has been provided a novel instruction package and elements thereof which fulfill the objects and advantages sought therefor.

It is to be understood that the foregoing description and the accompanying drawings have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, an instruction unit comprising a single sheet, reading material on said sheet, a pocket on said sheet elongated in nature, and a film strip in said pocket including a plurality of picture frames containing projectable images in a predetermined sequence, the reading material containing information about the projectable images in a sequence coordinated with the sequence of the images, each picture frame thereby being coordinated with said reading material to enable simultaneous consecutive showing of the picture frames on a viewing surface and the consecutive reading of the reading material.

2. The combination of claim 1 in which said single sheet takes the form of a folder.

3. In combination, a plurality of instruction units of claim 1 assembled as a book.

References Cited by the Examiner

UNITED STATES PATENTS

| 2,524,143 | 10/1950 | Smith | 35—35.5 |
| 2,961,922 | 11/1960 | Schwartz et al. | |
| 3,028,789 | 4/1962 | Wade | 40—28.3 |

FOREIGN PATENTS

| 947,741 | 1/1949 | France. |
| 797,324 | 7/1958 | Great Britain. |

EUGENE R. CAPOZIO, *Primary Examiner.*

LAWRENCE CHARLES, *Examiner.*

W. GRIEB, *Assistant Examiner.*